United States Patent [19]

Brayman

[11] Patent Number: 4,584,877
[45] Date of Patent: Apr. 29, 1986

[54] METHOD AND FIXTURE FOR LEAK DETECTION

[76] Inventor: Semyon Brayman, 28023 Berkshire, Southfield, Mich. 48076

[21] Appl. No.: 618,332

[22] Filed: Jun. 7, 1984

[51] Int. Cl.$^4$ .............................................. G01M 3/20
[52] U.S. Cl. ................................................................ 73/40.7
[58] Field of Search ....................... 73/40.7, 49.2, 49.3

[56] References Cited

U.S. PATENT DOCUMENTS

| | | | |
|---|---|---|---|
| 3,813,923 | 6/1974 | Pendleton | 73/40.7 X |
| 3,949,598 | 4/1976 | Bergstrand | 73/40.7 X |
| 4,055,984 | 11/1977 | Marx | 73/40.7 |

FOREIGN PATENT DOCUMENTS 1273379  5/1972  United Kingdom ................. 73/40.7

Primary Examiner—Stewart J. Levy
Assistant Examiner—Joseph W. Roskos
Attorney, Agent, or Firm—John R. Benefiel

[57] ABSTRACT

A method and fixture for leak detection testing of automotive fuel tanks and the like is disclosed. Two separable members are movable together to form a housing having an internal cavity shaped to receive tanks to be tested, with a sufficient clearance space to accommodate dimensional variations in the tanks to be tested. Each housing member is generally bowl-shaped with a relatively thin-walled, semi-rigid domed central portion, which with the members brought together defines a test cavity receiving the tank proper. Each member also has a relatively rigid peripheral rim supported in a frame. During testing, a tank is positioned within the test cavity and the tank interior pressurized with a trace gas mixture. The space between the housing and the tank is thereafter evacuated, causing the ribbed interior of the less rigid central portions of the housing members to move into contact with the tank exterior, preventing the high differential pressure from overexpanding the tank to cause damage. Detection of trace gas in the clearance space is relied on to detect leaks in the tank. Openings in the tank are sealed during testing by means of movable seal plugs carried by the housing members.

18 Claims, 6 Drawing Figures

METHOD AND FIXTURE FOR LEAK DETECTION

BACKGROUND DISCUSSION

The present invention concerns leak detection and more particularly the testing of containers such as auto fuel tanks to identify any tanks having leaks.

It is often necessary to inspect vessels such as gasoline fuel tanks during their production to insure that even very slight leaks are not present. A common test procedure is to pressurize the interior of the tank with a trace gas mixture and provide an arrangement for detecting the presence of trace gas in a cavity surrounding the tank, to thereby establish whether or not a leak is present in the tank being tested.

See for example, U.S. Pat. No. 3,813,923 which shows such a test apparatus.

In the production of fuel tanks in the very high volumes of the automotive industry, the time required for completion of the leak test is of crucial significance. Since the time to carry out such test is proportional to the differential pressures across the tank wall at which the tests are run, and since very slight leaks must be detected for such applications, the leakage rate will require excessively long test periods for reliable testing.

On the other hand, typical fuel tanks, cannot withstand even moderate differential pressures without damage due to the resulting overexpansion.

The dimensional variations normally encountered during manufacture of the fuel tanks precludes the manufacture of a rigid surrounding chamber to enclose the tank, since excessive clearance spaces therebetween would allow such damage to occur as the tank expanded into the clearance spaces.

One solution to the problem of accommodating dimensional variations in the fuel tanks while protecting the tank from the damaging effects of expanding under excessive differential pressures is described in the aforementioned U.S. Pat. No. 3,813,923. In this patent, surrounding diaphragms are placed within the test fixture and the exterior of the diaphragms are pressurized during the application of a vacuum to the space between the diaphragms and the tank, and pressurized gas is communicated to the interior of the tank. The surrounding diaphragms apply a counteracting force to neutralize the effect of the high differential pressure created by the surrounding vacuum to thereby protect the tank from pressure-induced damage.

See also U.S. Pat. No. 4,055,984 to Marx which discloses surrounding a container to be leak tested with a flexible test housing which does not involve the pressurization of the exterior of the flexible housing.

Fuel tanks normally have two or more openings which must be sealed during testing, such as the filler opening and the fuel line outlet, and also typically an electronic fuel level detector package is mounted within another opening in the bottom of the gasoline tank.

In order to achieve the desired goal of rapid testing, it is highly desirable to provide for automatic resealing of such openings as by an automatically operated sealing arrangement incorporated in the test fixturing. This eliminates a separate installation or assembly step in the leak detection test procedure.

In the arrangements of the aforementioned U.S. patents, a flexible housing surrounding the fuel tank cannot provide a fixturing for sealing of these openings due to the lack of structural support available from the flexible housings. This also necessitates a separate fixturing for supporting the weight of the tank during testing. The use of fixturized sealing tank arrangements would necessitate accurate location of the tank which also cannot be achieved by a flexible housing.

In typical fuel tanks, the tank is formed by two opposing members having aligned flanges which are welded, brazed or otherwise secured together to seal the tank interior. A very high proportion of the leaks experienced in such tanks occur in the flange region. On the other hand, the flange region is much less susceptible to failure upon exertion of the relatively high differential pressures thereacross even when unsupported. It is thus desirable that the reliability of the leak testing be extremely high for detecting leaks in the flange regions of the tanks.

Accordingly, it is an object of the present invention to provide a method and fixture for leak detection testing on a production basis for such containers as auto fuel tanks in which the application of excessively high forces on the tank from the effects of differential pressures are avoided.

It is another object of the present invention to provide a fixturing for leak detection in which sealing arrangements for tank openings are carried by the fixturing and includes a housing in which the gasoline tank is accurately located for proper operation of such sealing arrangements.

It is yet another object of the present invention to provide a fixturing for leak detection of fuel tanks and the like in which a single fixture housing is employed to define a clearance cavity between the tank and the housing for carrying out a pressure leak test of the tank, which does not result in differential pressure-induced damage to the tank and yet allows a relatively high differential pressure to be experienced by the tank to insure rapid leak detection testing.

It is still another object of the present invention to provide a method and fixture for leak testing of flanged containers such as fuel tanks which have a maximum reliability for detecting leaks in the flange regions thereof.

SUMMARY OF THE INVENTION

These and other objects of the present invention, which will become apparent upon a reading of the following specification and claims, are achieved by a fixturing consisting of two separate members movable together to form a housing defining a test cavity to enclose the tank with a predetermined clearance space therebetween. Each member is generally bowl-shaped with a domed central region and a peripheral rim. Each of the housing members have a relatively thin wall thickness in the domed central region and are of a material such as molded polyurethane plastic so as to be semi-rigid in that region. Relatively thicker walls on the rim portions make these portions relatively rigid.

The housing members are mounted to be movable apart to enable implacement and removal of the tank to be tested. When brought together, the housing members have their rims aligned, with the domed central regions oppositely facing to define the test cavity with a clearance space between the tank exterior and the interior of the housing members. This clearance space is at a minimum in the domed central region of the housing so that deflection inwardly results in contacting of ribs formed on interior surfaces with the tank exterior to neutralize the tendency to expand the tank under a high differential pressure. A substantial clearance surrounds the flange portion of the gasoline tank so that contact does not occur in the flange region for maximum test reliability in detecting leaks in that region.

The housing member thickness also varies from a relatively thin section in the central domed regions to a relatively thick section adjacent the flange cavity. This provides a semi-rigidity of the dome region of a lesser stiffness than the tank walls, so that inward deflection of these regions occurs to come into contact with the tank exterior, with only minimal expansion of the tank. The housing member rim sections adjacent the flange cavities are sufficiently thicker to be substantially rigid to maintain the clearance with the tank flange even under high differential pressures.

Accordingly, upon application of a pressurized mixture of trace gas to the tank interior and the application of a vacuum in the clearance space, the semi-rigid central portions of the housing members deflect inwardly, such that the ribs contact the tank exterior to neutralize the expanding forces generated by a high differential pressure acting across the tank walls. At the same time, a large clearance space is maintained adjacent the tank flange where the majority of leaks occur, which may be allowed since the tank is relatively invulnerable to pressure failure in that region.

The substantial structural rigidity of the housing members allows the test cavity to act as a locating fixturing of the tank and to enable mounting of arrangements for sealing the tank openings by means of cylinder operated plunger seals.

In one arrangement, the movable plunger seal is mounted within an opening in the housing sidewall which is sealed and is movable upon actuation of a power actuator cylinder to effect sealing of a side opening.

Where tank openings are located centrally in the domed central region of the bottom housing, the housing member wall is deflected by means of an actuator cylinder and this deflection of the housing wall causes movement of one or more seals into sealing engagement with the tank bottom openings.

A bottom tank opening seal is also utilized to establish fluid communication with the tank interior during testing to allow pressurization of the tank interior with a trace gas mixture by means of fittings associated with the movable seal.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
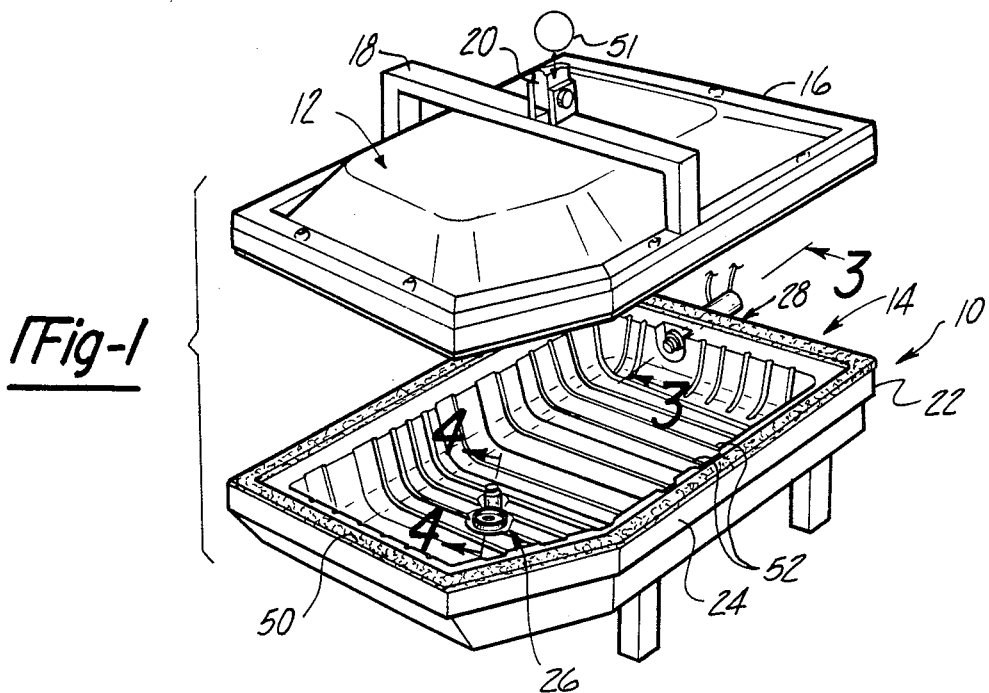
FIG. 1 is a perspective view of a test fixture according to the present invention with the fixture housing members in the separated position.
Figure 2:
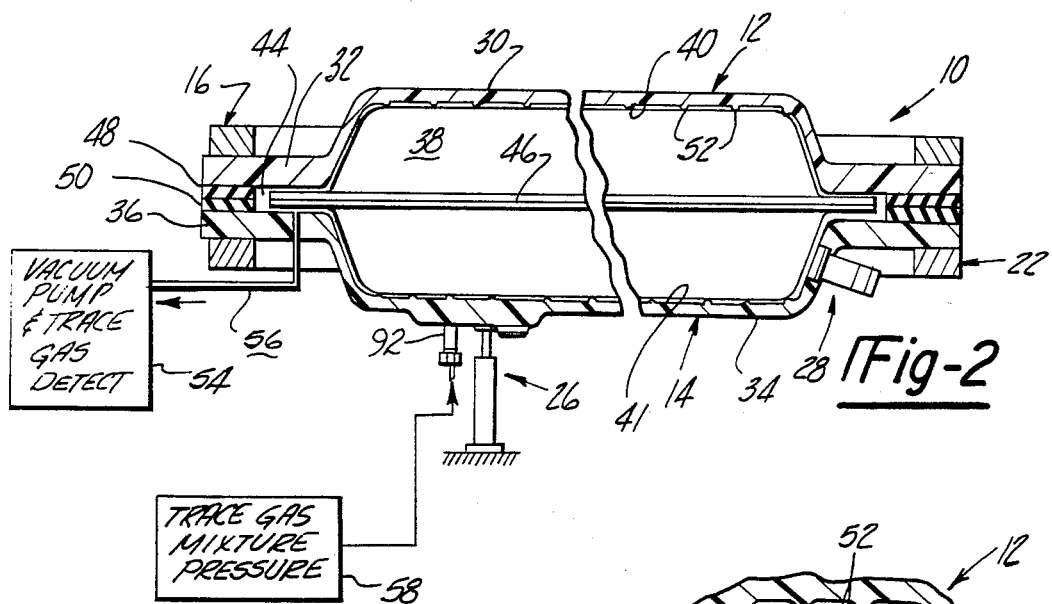
FIG. 2 is a fragmentary sectional, partially diagrammatic representation of the testing fixture and associated system components with a tank to be leak tested in position within the fixture.

Referring to the drawings and particularly FIGS. 1 and 2, the fixturing 10 according to the present invention includes a pair of separable housing members, upper housing member 12 and lower housing member 14. The upper housing member 12 is carried in a lifting frame 16 secured to the periphery of the upper housing member 12 and adapted to be raised and lowered onto the lower housing member 14 by means of a cross member 18 and a lifting link 20 connected to a lifting mechanism represented diagrammatically at 51. Lower housing member 14 rests in a bed frame 22, comprised of frame members 24 extending beneath the periphery of the lower housing member 14.

As will be described hereinafter in further detail, the fixturing 10 includes arrangements for sealing openings in the tanks to be tested, including a bottom sealing arrangement 26 and a side opening sealing arrangement 28.

Each of the upper housing member 12 and lower housing member 14 is generally bowl-shaped and positioned with the interior surfaces facing each other. The upper housing member 12 includes a central domed region 30 and a peripheral rim portion 32, and similarly, lower housing member 14 includes a central domed region 34 and a peripheral rim portion 36.

Housing members 12 and 14 are adapted to be positioned with the interior of the domed regions 30 and 34 facing each other and rim sections 32 and 36 aligned to define a test cavity therebetween configured such that a flanged test tank 38 may be accommodated therein with an adequate clearance space to accommodate normal dimensional variations between individual tanks to be tested.

A first region of the test cavity is defined by the interior faces 40 and 41 of each of the upper housing member 12 and lower housing member 14, accommodating the tank proper.

A second region 44 of the test cavity is defined between the opposing inside faces of the rim portions 32 and 36 which are spaced apart with the housing members brought together to create the peripheral test cavity region 44 accepting a peripheral flange typical of fuel tank construction.

Housing members 12 and 14 when brought together are sealed in order to provide a fluid tight test cavity and for this purpose a gasket 48 is provided on the inside face of the rim portion 32 of upper housing member 12 and a gasket 50 on the rim portion of the lower housing member 14.

The operating mechanism 51 acts to raise and lower the upper housing member 12 and to sealingly engage the gasket faces 48 and 50 together when the housing members are in their assembled position prior to initiating the leak test operation.

The leak testing is achieved by pressurization of the interior of the test piece 38 with a trace gas mixture as will be described hereinafter, and a clearance space is maintained between the interior of the test cavity and the test piece 38 which clearance is evacuated to increase the differential pressure across the tank wall to increase the rate of flow of the trace gas mixture into the clearance space through any leaks.

According to the concept of the present invention, there is a minimal clearance space between the interior faces 40 and 41 of domed regions 30 and 34, respectively, just sufficient to accommodate dimensional variations encountered in individual test pieces. Sufficient clearances have been determined to be on the order of 0.050 to 0.100 inch between a normally sized test piece.

The inside surfaces 40 and 41 of the semi-rigid central regions 30 and 34 are formed with ribs 52 which are widely spaced in order to allow fluid flow therebetween after the semi-rigid portions have been drawn into contact with the exterior surface of the test piece 38, as will be described hereinafter.

The test cavity region 44 receives the flange 46 of test piece 38 and is not formed with ribs or the like, since substantial deflection of the rim portions 36 and 32 does not occur due to the relative rigidity of these sections.

To achieve this purpose, the semi-rigid central region 30 is formed with a relatively thin wall, on the order of ⅝ inch in thickness whereas the rim portions 32 and 36 are relatively thicker to establish a much higher degree of ridigity, i.e., a thickness on the order of one inch.

It has been found to be advantageous to form the housing members 12 and 14 from mold components made by an impression taken from actual test pieces, with suitable known techniques employed to create the clearances described above. Polyurethane plastic material of 80 durometer has been found to produce sections of rigidity and semi-rigidity, as described, with the wall thicknesses specified above.

As noted, the test cavity is caused to be evacuated to create a vacuum in the clearance space between the test piece 38 and the housing members 12 and 14. The technique is very well known and a vacuum pump 54 is described shown schematically together with a trace gas detector. This apparatus is of conventional design and very well known to those skilled in the art, as described in the U.S. Patents cited above.

A connecting passage 56 allows the evacuation of the test cavity and the detection of any trace gas which is found in the clearance spaces after the test has been initiated.

The interior of the test piece 38 is adapted to be pressurized with a trace gas mixture such as a freon or similar type gas, at relatively moderate pressure from source 58, i.e., 1.5 psig. The particulars of the introduction of this gas into the tank or test piece interior will be described hereinafter.

Such test pieces 38 as automotive fuel tanks often have two or more openings which must be sealed in order to allow pressurization of the tank interior and the detection of leaks by the flow of test gas or fluid into the clearance space through leaks.

Figure 3:
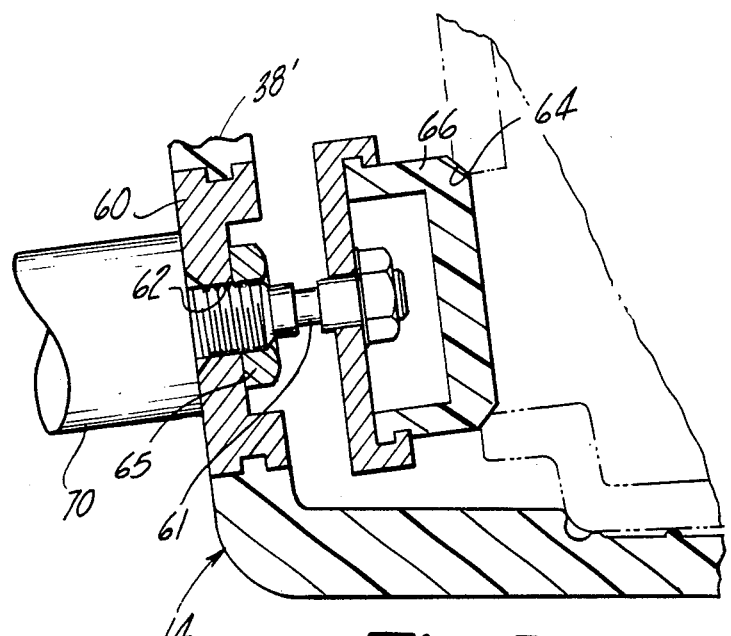
FIG. 3 is an enlarged fragmentary view showing a sealing arrangement for a side opening in the tank.

Arrangement 28 is suitable for sealing side openings as shown in FIG. 3 in which a plate 60 is molded within the lower housing member 14 adjacent to define a threaded opening 62 formed thereinto. A pneumatic cylinder 70 is mounted to the plate 60 by being threaded within the opening 62, a seal 65 provided to seal off the interior of the test cavity within housing member 14. A sealing plug 66 is affixed to an actuating rod 68 of a pneumatic cylinder 70.

The position of the test piece 38 within the lower housing member 14 locates the tank opening 64 in alignment with the movable sealing plug 66. Accordingly, upon extension of actuating rod 60 by pressurizing the cylinder 70, the sealing plug 66 moves into engagement with the tank opening 64 to seal off the same.

Figure 4:
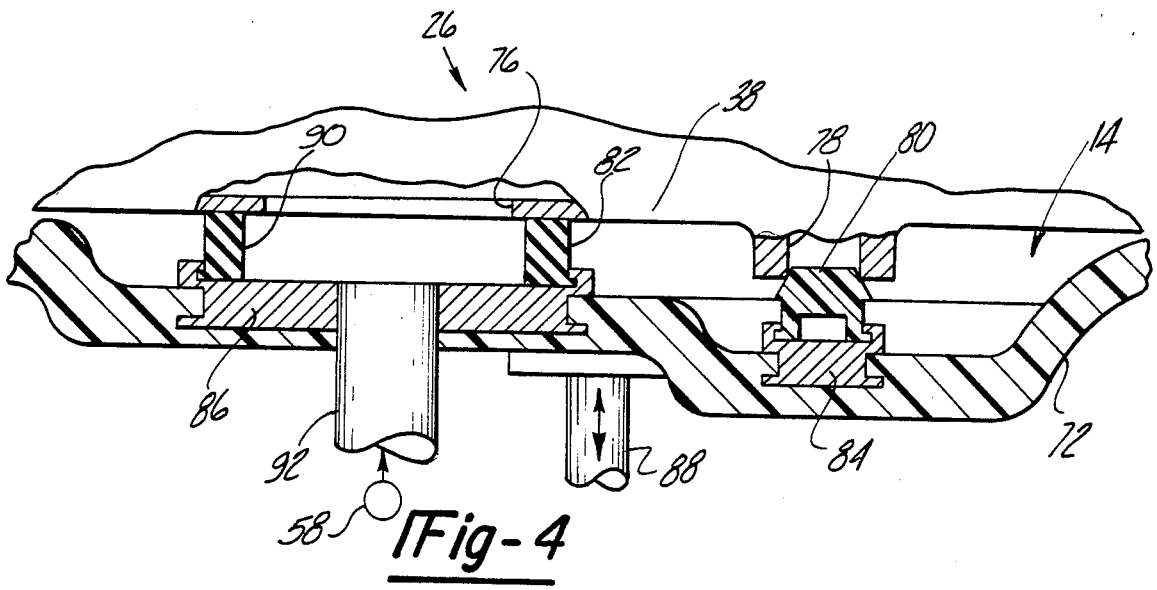
FIG. 4 is an enlarged sectional, fragmentary view of the test fixture components associated with sealing of tank bottom openings.

The sealing arrangement 26 is shown in FIG. 4 which depicts a dished region 72 formed in the central region 34 of the lower housing member 14 opposite a pair of openings 76 and 78 to be sealed in the bottom of the test piece 38.

A pair of sealing plugs 80 and 82 are provided, mounted by retainers 84 and 86 molded into region 72 and positioned in alignment with the openings 76 and 78 with the test piece 38 in position. The entire region 72 is moved to achieve engagement of the sealing plugs 80 and 82, which movement is accommodated by the relative flexibility of the lower housing member 14 in the central region 34. This movement is achieved by an actuating rod 88 moved by a pneumatic actuator (not shown) to cause advance of both sealing plugs 80 and 82 into sealing engagement with the openings 76 and 78, respectively.

The sealing plug 82 is formed with a through opening 90 which advantageously will allow introduction of a trace gas mixture to the interior of the tank by means of a pipe fitting 92 received in the retainer 86 and in communication with openings 76 and the interior of the tank 38.

The source of pressurized trace gas 38 is connected to the pipe fitting 92 to enable the communication of the source 58 with the inside of the tank 38.

Figure 5:
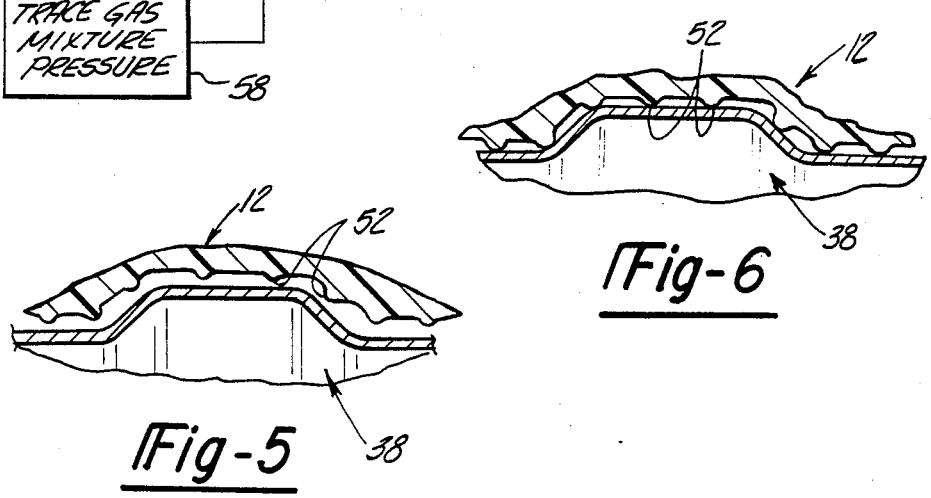
FIG. 5 is a fragmentary sectional view showing a portion of the semi-rigid central region of a housing member and adjacent tank wall prior to pressurization of the tank and application of vacuum in the clearance space.
Figure 6:
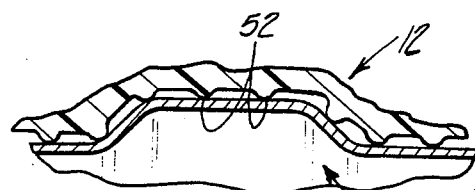
FIG. 6 is a fragmentary sectional view of the housing and tank portion shown in FIG. 5 after pressurization of the tank and evacuation of the clearance space to bring the ribs on the interior surface of the housing member into contact with the exterior of the tank under test.

Referring to FIGS. 5 and 6, the deflection of the relatively semi-rigid central regions 30 and 34 of the tank of the housing members 12 and 14, respectively, can be appreciated occurring. Upon pressurization of the interior of the tank 38 and evacuation of the clearance spaces, relatively slight clearances are provided on the order of 0.050 to 0.100 inch between the ribs 52 and the exterior of the test piece 38.

This clearance is selected to accommodate the variations in dimensions between individual test piece specimens and yet substantially locate the test piece 38 within the cavities such that the openings can be engaged by sealing arrangements 26 and 28.

The semi-rigid nature of the central regions 30 and 34 is such that upon evacuation of the clearance space and pressurization of the tank 38, the central regions 30 and 34 are deflected inwardly by the differential pressure, such that the ribs 52 engage the tank 38 exterior and neutralize the effects of this pressure on the housing members 12 and 14. This situation is shown in FIG. 6. Thus, the central regions of the tank 38, while being relatively fragile, are not allowed to expand excessively while experiencing high differential pressures between the evacuated clearance space and the slightly pressurized interior. Thus, a high differential pressure may be exerted, tending to induce a higher flow from the tank interior of the trace gas mixture into the clearance space, such that the time required is minimized.

The tank 38 is reinforced by the housing members themselves to better enable resistance to the moderate pressure in the tank interior.

The clearance spaces 44 adjacent the flange 46 is relatively greater and no substantial deflection inwardly to contact with the flange is effected. The flange areas are therefore not touched by any portion of the housing members 12 or 14. These regions of the tank are able to resist safely the high differential pressures exerted thereon. This arrangement eliminates any possibility of a leak being obscured by contact with the ribs 52. Relatively large clearances are provided in cavity region 44 with the flange 46 to insure such contact does not occur, i.e., a distance on the order of a major fraction of an inch.

Accordingly, it can be appreciated that a relatively simple apparatus and process is provided which allows for high production testing of workpieces such as automotive fuel tanks with a high degree of reliability and with a minimal test cycle time required. It does not require substantial labor to conduct the test and is easily adapted to a wide variety of test piece configurations.

It can therefore be appreciated that the above-recited objects of the present invention are achieved by the structure described herein.

We claim:

1. A leak test fixture for testing hollow container test pieces comprising a pair of separable housing members, each housing member being generally bowl-shaped with a generally dome-shaped central region surrounded by a peripheral rim portion, said central region of each of said housing members being deflectable inwardly under pressure and said rim portion of each of said housing members being relatively rigid;

means mounting each of said housing members for movement together with said rim portions and the inside of each of said central regions facing each other;

means creating a sealing engagement of said housing members upon said movement together to define a cavity therebetween, defined by said central regions and configured to receive a test piece with clearance spaces between the interior of said housing members and the exterior of said test piece;

at least one sealing actuator arrangement carried by at least one of said housing members comprised of a sealing plug positioned within said test cavity to be engageable with an opening on a test piece also positioned within said test cavity, and means moving said sealing plug into sealing engagement with said test piece opening;

the interior of each of said central regions formed with spaced ribs extending thereacross to be adapted to contact a test piece disposed in said test cavity upon inward deflection of said central regions;

means for pressurizing the interior of a test piece placed in said test cavity with a test fluid;

means for at least partially evacuating the clearance space between said housing members and said test piece to initiate flow of said test fluid thereinto in the presence of a leak in said test piece; and, means for detecting the presence of test fluid from the interior of said test piece in said clearance space.

2. The leak test fixture according to claim 1 wherein said sealing actuator arrangement includes an actuator located outside said test cavity and acting on said sealing plug through said at least one housing member.

3. The leak test fixture according to claim 2 wherein said sealing plug is secured to said housing member in the central region thereof and wherein said actuator acts on the exterior of said housing to move said sealing plug into engagement with said test piece opening.

4. The leak test fixture according to claim 3 wherein said sealing plug has an opening therethrough and wherein said means for pressurizing the interior of said test piece with a test fluid includes a fitting mounted extending through an opening in said at least one housing enabling communication with said test piece interior through said opening in said sealing plug.

5. The leak test fixture according to claim 2 wherein said actuator includes an actuator rod extending through an opening in said at least one housing member, and wherein said sealing plug is affixed to said actuator rod.

6. The leak test fixture according to claim 1 wherein each of said housing members is formed of molded plastic of a substantially thinner cross section in said central regions than in said rim portions thereof.

7. The leak test fixture according to claim 6 wherein said plastic material is polyurethane having a thickness on the order of five-eighths inch in said central region and one inch in said rim portions.

8. The leak test fixture according to claim 7 wherein said clearance between said test piece and said housing members is on the order of 0.050–0.100 inch in said central region and substantially larger adjacent said rim portions.

9. A method of leak testing a hollow container test piece comprising the steps of:

forming a test cavity defined by separable members configured to enclose said test piece with a clearance space therebetween with said members positioned together, said separable members having semi-rigid portions closely adjacent said test piece with said members positioned together, and able to be more readily deflectable than the test piece to be brought into contact with the test piece upon evacuation of the space therebetween;

shaping each of said housing members with generally dome-shaped central regions comprising said semi-rigid portions extending therebetween each housing member, and positioning said members to define a test cavity including a space intermediate said central region receiving said tank and a space between said peripheral rims receiving said flange of said tanks;

forming the inside surface of said semi-rigid portions with spaced ribs to contact said test piece while allowing fluid flow therebetween;

positioning a test piece within said test cavity;

sealing said cavity;

pressurizing the interior of said test piece with a test fluid;

at least partially evacuating said clearance spaces to induce flow of said test fluid thereinto in the presence of a leak in said test part; and, detecting test fluid in said clearance space to thereby detect said leak.

10. The method according to claim 9 wherein in said forming step said clearance space adjacent said semi-rigid sections is extended a distance on the order of 0.050–0.100 inch.

11. The method according to claim 9 wherein said peripheral rim of each housing member is formed to be relatively rigid and said test cavity between said rims creates a relatively large clearance space between said housing member and said flange of said tank compared to said clearance space between said central regions and said tank.

12. The method according to claim 11 wherein said housing members are molded with a thickness on the order of five-eighths inch in said central region and said rim portions are on the order of one inch in thickness and wherein said housing members are molded of polyurethane plastic having an 80 durometer hardness.

13. The method according to claim 9 wherein in said pressurizing step, said test fluid is at a pressure on the order of 1.5 psig.

14. A leak test fixture for testing hollow container test pieces comprising a pair of separable housing members, each housing member being generally bowl-shaped with a generally dome-shaped central region surrounded by a peripheral rim portion, said central region of each of said housing members being deflectable inwardly under pressure and said rim portion of each of said housing members being relatively rigid;
- means mounting each of said housing members for movement together with said rim portions and the inside of each of said central regions facing eachother;
- means creating a sealing engagement of said housing members upon said movement together to define a cavity therebetween, defined by said central regions and configured to receive a test piece with clearance spaces between the interior of said housing members and the exterior of said test piece;
- a test cavity region also defined between said rim portions of said housing members with said housing members brought together, to accommodate a flange feature on said test piece with a substantial clearance therebetween;
- the interior of each of said central regions formed with spaced ribs extending thereacross to be adapted to contact a test piece disposed in said test cavity upon inward deflection of said central regions;
- means for pressurizing the interior of a test piece placed in said test cavity with a test fluid;
- means for at least partially evacuating the clearance space between said housing members and said test piece to initiate flow of said test fluid thereinto in the presence of a leak in said test piece; and,
- means for detecting the presence of test fluid from the interior of said test piece in said clearance space.

15. A method of leak testing a hollow container test piece comprising the steps of:
- forming a test cavity defined by separable members configured to enclose said test piece with a clearance space therebetween with said members positioned together, said separable members having semi-rigid portions closely adjacent said test piece with said members positioned together, and able to be more readily deflectable than the test piece brought into contact with the test piece upon evacuation of the space therebetween;
- forming the inside surface of said semi-rigid portions with spaced ribs to contact said test piece while allowing fluid flow therebetween;
- positioning a test piece within said test cavity;
- sealing said cavity;
- sealing openings in said test piece by moving seal plugs supported on said housing members into sealing contact with openings in said test piece;
- pressurizing the interior of said test piece with a test fluid;
- at least partially evacuating said clearance spaces to induce flow of said test fluid thereinto in the presence of a leak in said test part; and,
- detecting test fluid in said clearance space to thereby detect said leak.

16. The method according to claim 15 wherein said step of pressurizing the interior of said test piece with test fluid includes the step of introducing said test fluid through an opening in one of said seal plugs.

17. The method according to claim 15 wherein at least one of said seal plugs is mounted to said central region of one of said members.

18. A method of leak testing a hollow container test piece comprising the steps of:
- forming a test cavity defined by separable members by molding a pair of housing members from a mold made with an impression of a sample test piece so that said separable members are configured to enclose said test piece with a clearance space therebetween with said members positioned together, said separable members having semi-rigid portions closely adjacent said test piece with said members positioned together, and able to be more readily deflectable than the test piece to be brought into contact with the test piece upon evacuation of the space therebetween.
- forming the inside surface of said semi-rigid portions with spaced ribs to contact said test piece while allowing fluid flow therebetween;
- positioning a test piece within said test cavity;
- sealing said cavity;
- pressurizing the interior of said test piece with a test fluid;
- at leaast partially evacuating said clearance spaces to induce flow of said test fluid thereinto in the presence of a leak in said test part; and,
- detecting test fluid in said clearance space to thereby detect said leak.

* * * * *